US010423780B1

(12) United States Patent
Kopylov et al.

(10) Patent No.: US 10,423,780 B1
(45) Date of Patent: Sep. 24, 2019

(54) SYSTEM AND METHOD FOR SYNTHESIS OF CORRECT-BY-CONSTRUCTION CRYPTOGRAPHIC SOFTWARE FROM SPECIFICATION

(71) Applicant: HRL Laboratories, LLC, Malibu, CA (US)

(72) Inventors: Alexei Kopylov, Pasadena, CA (US); Aleksey Nogin, Fresno, CA (US)

(73) Assignee: HRL Laboratories, LLC, Malibu, CA (US)

( * ) Notice: Subject to any disclaimer, the term of this patent is extended or adjusted under 35 U.S.C. 154(b) by 221 days.

(21) Appl. No.: 15/669,506

(22) Filed: Aug. 4, 2017

Related U.S. Application Data

(60) Provisional application No. 62/371,035, filed on Aug. 4, 2016.

(51) Int. Cl.
| | | |
|---|---|---|
| *G06F 21/54* | (2013.01) | |
| *G06F 21/60* | (2013.01) | |
| *G06F 12/14* | (2006.01) | |
| *H04L 29/06* | (2006.01) | |
| *G06F 21/57* | (2013.01) | |

(52) U.S. Cl.
CPC .......... *G06F 21/54* (2013.01); *G06F 12/1408* (2013.01); *G06F 21/577* (2013.01); *G06F 21/602* (2013.01); *H04L 63/168* (2013.01); *G06F 2212/1052* (2013.01); *G06F 2221/033* (2013.01)

(58) Field of Classification Search
CPC ....................................................... G06F 21/54
USPC ........................................................ 713/152
See application file for complete search history.

(56) References Cited

U.S. PATENT DOCUMENTS

2009/0319804 A1* 12/2009 Qi ....................... G06F 9/30145
713/190

OTHER PUBLICATIONS

Martn Abadi and Cédric Fournet. Mobile values, new names, and secure communication. SIGPLAN Notices, 36(3): pp. 104-115, 2001.

Andrew W. Appel. Verification of a cryptographic primitive: SHA-256. ACM Trans. Program. Lang. Syst., 37(2):pp. 7:1-7:31, Apr. 2015.

Karthikeyan Bhargavan, Ricardo Corin, Pierre-Malo Denielou, Cedric Fournet, and James J. Leifer. Cryptographic protocol synthesis and verification for multiparty sessions. 2012 IEEE 25th Computer Security Foundations Symposium, pp. 124-140, 2009.

Gilles Barthe, Juan Manuel Crespo, Sumit Gulwani, Cesar Kunz, and Mark Marron. From relational verification to SIMD loop synthesis. SIGPLAN Not., 48(8): pp. 123-134, Feb. 2013.

(Continued)

*Primary Examiner* — Jacob Lipman

(74) *Attorney, Agent, or Firm* — Tope-McKay & Associates

(57) ABSTRACT

Described is a system for synthesis of cryptographic software from specification. During operation, the system generates a first level formalization code of a cryptographic protocol based on a user input protocol specification and a library of transformation rules. A second level formalization code is then generated by implementing communication protocols to the first level formalization code. A third level formalization code subsequently generated by implementing cryptographic primitives to the second level formalization code. Finally, the third level formalization code is encoded on a computer readable medium as an executable code.

20 Claims, 4 Drawing Sheets

(56) References Cited

OTHER PUBLICATIONS

Michael Backes, Iliano Cervesato, Aaron D. Jaggard, Andre Scedrov, and Joe-Kai Tsay. Cryptographically sound security proofs for basic and public-key Kerberos. In Proceedings of the 11th European Symposium on Research in Computer Security, vol. 4189 of Lecture Notes in Computer Science, pp. 362-383. Springer Berlin/Heidelberg, Sep. 2006.
Frederick Butler, Iliano Cervesato, Aaron D. Jaggard, Andre Scedrov, and Christopher Walstad. Formal analysis of Kerberos 5. Theoretical Computer Science, 367(1): pp. 57-87, 2006.
Frederick Butler, Iliano Cervesato, Aaron D. Jaggard, and Andre Scedrov. A formal analysis of some properties of Kerberos 5 using MSR. In Fifteenth Computer Security Foundations Workshop (CSFW-15), pp. 175-190. IEEE Computer Society Press, 2002.
Gilles Barthe, François Dupressoir, Benjamin Grégoire, César Kunz, Benedikt Schmidt, and Pierre-Yves Strub. Easycrypt: A tutorial. In Alessandro Aldini, Javier Lopez, and Fabio Martinelli, editors, Foundations of Security Analysis and Design VII, vol. 8604 of Lecture Notes in Computer Science, pp. 146-166. Springer International Publishing, 2014.
Karthikeyan Bhargavan, Cédric Fournet, Markulf Kohlweiss, Alfredo Pironti, Pierre-Yves Strub, and Santiago Zanella-Béguelin. Proving the TLS handshake secure (as it is). Cryptology ePrint Archive, Report 2014/182, pp. 1-48, 2014.
Gilles Barthe, Benjamin Grégoire, and Santiago Zanella Béguelin. Probabilistic relational Hoare logics for computer-aided security proofs. In Jeremy Gibbons and Pablo Nogueira, editors, Mathematics of Program Construction, vol. 7342 of Lecture Notes in Computer Science, pp. 1-6. Springer Berlin Heidelberg, 2012.
Michael Backes, Birgit Pfitzmann, and Michael Waidner. Symmetric authentication within a simulatable cryptographic library. In Einar Snekkenes and Dieter Gollmann, editors, Computer Security—ESORICS 2003, vol. 2808 of Lecture Notes in Computer Science, pp. 271-290. Springer Berlin Heidelberg, 2003.
Sally Browning and Philip Weaver. Design and Verification of Microprocessor Systems for High-Assurance Applications, chapter Designing Tunable, Verifiable Cryptographic Hardware Using Cryptol, pp. 89-143. Springer US, Boston, MA, 2010.
Iliano Cervesato. Typed MSR: Syntax and examples. In MMM-ACNS'01: Proceedings of the International Workshop on Information Assurance in Computer Networks, vol. 2052 of Lecture Notes in Computer Science, pp. 159-177. Springer-Verlag, 2001.
Iliano Cervesato, Aaron D. Jaggard, Andre Scedrov, Joe-Kai Tsay, and Christopher Walstad. Breaking and fixing public-key Kerberos. Information and Computation, 206(2-4): pp. 402-424, 2008.
Cas Cremers. On the protocol composition logic pcl. In ASIACCS '08: Proceedings of the 2008 ACM symposium on Information, computer and communications security, pp. 66-76, New York, NY, USA, 2008. ACM.
Iliano Cervesato and Andre Scedrov. Relating state-based and process-based concurrency through linear logic (full-version). Information and Computation, 207(10): pp. 1044-1077, 2009.
Anupam Datta, Ante Derek, John C. Mitchell, and Arnab Roy. Protocol composition logic (pcl). Electronic Notes in Theoretical Computer Science, 172: pp. 311-358, 2007.
Easycrypt website. https://www.easycrypt.info/trac, downloaded on Sep. 27, 2017.
Cédric Fournet and Martn Abadi. Hiding names: Private authentication in the applied pi calculus. In Mitsuhiro Okada, Benjamin C. Pierce, Andre Scedrov, Hideyuki Tokuda, and Akinori Yonezawa, editors, ISSS 2002, vol. 2609 of Lecture Notes in Computer Science, pp. 317-338. Springer, 2003.
Deepak Garg, Lujo Bauer, Kevin Bowers, Frank Pfenning, and Michael Reiter. A linear logic of authorization and knowledge. In Proceedings of the 11th European Symposium on Research in Computer Security, pp. 297-312, 2006.
Jean-Yves Girard. Linear logic and parallelism. In Proceedings on Mathematical Models for the Semantics of Parallelism, pp. 166-182, London, UK, 1987. Springer-Verlag.
Oded Goldreich. A simple protocol for signing contracts. In Advances in Cryptology—Crypto '83, London, UK, 1983. Springer-Verlag.
Jason Hickey and Aleksey Nogin. Extensible hierarchical tactic construction in a logical framework. In Konrad Slind, Annette Bunker, and Ganesh Gopalakrishnan, editors, Proceedings of the 17 th International Conference on Theorem Proving in Higher Order Logics (TPHOLs 2004), vol. 3223 of Lecture Notes in Computer Science, pp. 136-151. Springer-Verlag, 2004.
Jason Hickey and Aleksey Nogin. Formal compiler construction in a logical framework. Higher-Order and Symbolic Computation, 19(2-3): pp. 197-230, Sep. 2006.
Jason Hickey, et al., MetaPRL—A modular logical environment. In David Basin and Burkhart Wolff, editors, Proceedings of the 16 th International Conference on Theorem Proving in Higher Order Logics (TPHOLs 2003), vol. 2758 of Lecture Notes in Computer Science, pp. 287-303. Springer-Verlag, 2003.
C. A. R. Hoare. An axiomatic basis for computer programming. Communications of the ACM, 12(10): pp. 576-580, 1969.
Changhua He, Mukund Sundararajan, Anupam Datta, Ante Derek, and John C. Mitchell. A modular correctness proof of IEEE 802.11i and TLS. In CCS '05: Proceedings of the 12th ACM conference on Computer and communications security, pp. 2-15, New York, NY, USA, 2005. ACM.
Wikipedia https://en.wikipedia.org/wiki/Dynamic_logic_(modal_logic), downloaded Sep. 20, 2017.
Grégoire Jacob, Eric Filiol, and Hervé Debar. Formalization of malware through process calculi. CoRR, abs/0902.0469, pp. 1-18, 2009. URL: http:// arxiv.org/abs/0902.0469.
Max Kanovich, Tajana Ban Kirigin, Vivek Nigam, Andre Scedrov, and Carolyn Talcott. Discrete vs. dense times in the verification of cyber-physical security protocols. In POST, pp. 259-279, 2015.
Max I. Kanovich, Paul Rowe, and Andre Scedrov. Collaborative planning with privacy. In CSF, pp. 265-278. IEEE Computer Society, 2007.
Max I. Kanovich, Paul Rowe, and Andre Scedrov. Policy compliance in collaborative systems. In CSF, pp. 218-233. IEEE Computer Society, 2009.
Ivan Lanese, Jorge A. Pérez, Davide Sangiorgi, and Alan Schmitt. On the expressiveness and decidability of higher-order process calculi. In Proceedings of the 23rd Annual IEEE Symposium on Logic in Computer Science (LICS 2008), pp. 145-155, Jun. 2008.
Robin Milner. Sorts in the π-calculus (extended abstract). In Eike Best and Grzegorz Rozenberg, editors, Proceedings of the Third Workshop on Concurrency and Compositionality (Goslar, Mar. 5-8, 1991), vol. 191 of GMD-Studien. GMD Bonn, St. Augustin, pp. 173-181, 1991.
Aleksey Nogin and Jason Hickey. Sequent schema for derived rules. In Victor A. Carreño, Cézar A. Muñoz, and Sophiène Tahar, editors, Proceedings of the 15 th International Conference on Theorem Proving in Higher Order Logics (TPHOLs 2002), vol. 2410 of Lecture Notes in Computer Science, pp. 281-297. Springer-Verlag, 2002. ISBN 3-540-44039-9.
Daniel Perelman, Sumit Gulwani, Thomas Ball, and Dan Grossman. Type-directed completion of partial expressions. In Proceedings of the 33rd ACM SIGPLAN Conference on Programming Language Design and Implementation, PLDI 12, pp. 275-286, New York, NY, USA, 2012. ACM.
Benjamin C. Pierce. Foundational calculi for programming languages. In Allen B. Tucker, editor, Handbook of Computer Science and Engineering, chapter 139, pp. 2190-2207. CRC Press, 1997.
Arnab Roy, Anupam Datta, Ante Derek, and John C. Mitchell. Secrecy analysis in protocol composition logic. In Proceedings of 11th Annual Asian Computing Science Conference, pp. 197-213, 2006.
Davide Sangiorgi. From pi-calculus to higher-order pi-calculus-and back. In TAPSOFT '93: Proceedings of the International Joint Conference CAAP/FASE on Theory and Practice of Software Development, pp. 151-166, London, UK, 1993. Springer-Verlag.

(56) References Cited

OTHER PUBLICATIONS

T.C. Scott and Wenxing Zhang. Efficient hybrid-symbolic methods for quantum mechanical calculations. Computer Physics Communications, 191: pp. 221-234, 2015.

A. Wang, L. Jia, W. Zhou, Y. Ren, B. T. Loo, J. Rexford, V. Nigam, A. Scedrov, and C. Talcott. FSR: Formal analysis and implementation toolkit for safe interdomain routing. Networking, IEEE/ACM Transactions on, 20(6): pp. 1814-1827, Dec. 2012.

Ningrong Zhang, Xingyuan Zhang, and Yuanyuan Wang. Mechanical proofs about BW multi-party contract signing protocol. Wuhan University Journal of Natural Sciences, 11(6): pp. 1516-1520, Nov. 2006.

G. Barthe, B. Grégoire, S. Heraud, S. Zanella-Béguelin. Formal certification of ElGamal encryption. A gentle introduction to CertiCrypt. In 5th International Workshop on Formal Aspects in Security and Trust, FAST 2008, vol. 5491 of Lecture Notes in Computer Science, pp. 1-19, Springer, 2009.

Lennart Beringer, Adam Petcher, Katherine Q. Ye, and Andrew W. Appel. 2015. Verified correctness and security of OpenSSL HMAC. In Proceedings of the 24th USENIX Conference on Security Symposium (SEC'15), Jaeyeon Jung (Ed.). USENIX Association, Berkeley, CA, USA, pp. 207-221.

The Coq Proof Assistant. URL: https :// coq.inria.fr/, taken on Jul. 20, 2017.

HOL Interactive Theorem Prover. URL: https :// hol-theorem-prover.org/, taken on Jul. 20, 2017.

Isabelle—University of Cambridge. URL: https :// www.cl.cam.ac.uk/research/hvg/Isabelle/, taken on Jul. 20, 2017.

MetaPRL Proof Assistant and Logical Programming Environment URL:metaprl.org, taken on Jul. 20, 2017.

David Harel, Jerzy Tiuryn, and Dexter Kozen. Dynamic Logic. MIT Press, Cambridge, MA, USA, 2000, Chapter 11 "First-Order Dynamic Logic," pp. 283-298.

\* cited by examiner

SYSTEM AND METHOD FOR SYNTHESIS OF CORRECT-BY-CONSTRUCTION CRYPTOGRAPHIC SOFTWARE FROM SPECIFICATION

CROSS-REFERENCE TO RELATED APPLICATIONS

This is a non-provisional patent application of U.S. Provisional Application No. 62/371,035, filed on Aug. 4, 2016, the entirety of which is hereby incorporated by reference.

BACKGROUND OF INVENTION

(1) Field of Invention

The present invention relates to a system that automatically generates cryptographic software and, more specifically, to system and method for automated synthesis of a correct-by-construction cryptographic protocol and its secure reliable software representation.

(2) Description of Related Art

Today's cryptographic code is notoriously unreliable. For example, a number of major vulnerabilities were recently discovered in all major software implementations of a commonly used two-party protocol. Thus, a new and secure multi-party protocol is needed that can be implemented into software systems and programs.

There are a number of ways how a protocol could be formalized. A protocol is a description of messages that parties exchange between each other. Basically, the protocol describes a parallel computation. Process calculi are the family of formal languages that are used for modeling computations in concurrent systems. Unlike the standard model of sequential computation, there is no standard model of parallelism. This is due to differences in which properties of the computation can be observed (see the List of Incorporated Literature References below, Literature Reference No. 37). Thus, there are many kinds of process calculi. The basic one is π-calculus (see Literature Reference No. 34). There is also High-order π-calculus. Literature Reference No. 39 proves the surprising result that High-order π-calculus does not add power to simple π-calculus. See also Literature Reference Nos. 1, 19, and 33. Literature Reference No. 29 uses process calculi for the formalization of malware.

Another way of describing protocols is using MSR (Multiset Rewriting Systems), which is a logic for representing security protocols (see Literature Reference No. 13). It can also be used to prove correctness of protocols. For example, it was applied to verify a commonly used cryptographic protocol Kerberos (see Literature Reference Nos. 5, 6, and 7). It was used to find a real problem in Kerberos by formal methods (see Literature Reference No. 14). MSR was also used for analysis of contract signing protocol (see Literature Reference No. 22). (Note that an alternative analysis of contract signing protocol was done in Literature Reference No. 42). The correspondence between MSR and formal logic is discussed in Literature Reference No. 16. It turns out that MSR corresponds to a fragment of Linear Logic (see Literature Reference No. 21). Note that Linear Logic is also used for specifying security policies (see Literature Reference No. 20) and for protocol analysis in collaborative planning (see Literature Reference Nos. 31 and 32).

An alternative logic for network protocol analysis is the Protocol Composition Logic (PCL). It is used to prove soundness of protocols. A good overview of PCL is in Literature Reference No. 17 and there is some interesting critique of PCL in Literature Reference No. 15. This logic is built from a process calculus with added abstractions for public and private cryptographic primitives. Its statements are similar to Hoare logic (see Literature Reference No. 26) and dynamic logic (see Literature Reference No. 28). It has a Frege-like proof system. Any statement that is proved in this system is sound in a strong sense: it holds for any protocol run. In this formalism, the correctness of a complex protocol could be proved from properties of simpler sub-protocols. It was applied to some well-known protocols such as SSL/TLS and IEEE 802.11i (see Literature Reference No. 27) and some serious security vulnerabilities were found. PCL (as well as MSR) was also used to verify Kerberos VS (see Literature Reference No. 38).

There are several languages that allow describing properties of the protocol, as follows:

1. CertiCrypt is a framework on a top of a Coq theory that formulates the correctness of the protocol as a Hoare relational logic (see Literature Reference No. 43). This project is abundant in favor of the EasyCrypt.
2. EasyCrypt (see Literature Reference No. 18) is the system for verifying the security of cryptographic primitive constructions. It uses computational model and standard cryptographic assumptions. See Literature Reference No. 10 for a condensed description and Literature Reference No. 8 for the tutorial. The examples of systems that could be verified are Cramer-Shoup and Hashed ElGamal. The system is interactive. It uses Hoare-like logic with statements of the form $[c_1 \sim c_2: \Phi \Rightarrow \Psi]$ where $c_1$ and $c_2$ are programs and are $\Phi$ and $\Psi$ memory relations. The semantics of the statements is not probabilistic, but one can infer probability judgment from statements of this form. It was used to prove the security of TLS Handshake protocol (see Literature Reference No. 9).

Some cryptographic protocols have been formally verified, but in such efforts typically only high-level descriptions are verified, not concrete code. One example of such work is "Formal analysis of Kerberos 5" (see Literature Reference No. 6).

In other art, program synthesis is a method of automatically generating a computer program from a set of constraints given by the user. The program synthesis is often coupled with the verification techniques, since it is easier to prove that synthesized program satisfies some properties. This verification method is called correct-by-construction proof. The existing synthesis techniques for non-cryptographic programs include: code completions (e.g., when the expression is completed using typing information (see Literature Reference No. 36) and SIMD Loop Synthesis (see Literature Reference No. 4). Program synthesis is also used for generating optimized code (see, for example, Literature Reference No. 40).

One very prominent example program synthesis for cryptographic domain is the very popular Cryptol specification language for synthesizing hardware implementations of cryptographic primitives (see Literature Reference No. 12). These efforts focused on verifying implementations of individual cryptographic primitives, but have been unable to extend that work to verification of implementations of complete cryptographic protocols. In other similar efforts, a small number of primitives have been formally verified, but only for simple not heavily optimized code. One example of such work is "Verification of a Cryptographic Primitive: SHA-256" (see Literature Reference No. 2).

When extending this work to HMAC, Princeton researchers (see Literature Reference No. 44) had to use 1998 version of OpenSSL in order to get code that is sufficiently simple to be verifiable with reasonable effort. In another effort, EasyCrypt proofs have been combined with Comp-Cert certified complication to provide synthesis of an encryption scheme (see Literature Reference No. 10). However, EasyCrypt proofs have a large unclear base, and therefore are not trustworthy. It also has a very limited proof power. It can prove only certain things, and the user is not able to expand this base. In particular, it could not be used for multi-party computation protocols.

Another approach is the development of "safe" domain-specific programming language for a small class of simple protocols. One example of such work is "Cryptographic Protocol Synthesis and Verification for Multiparty Sessions" (see Literature Reference No. 3). It provides a compiler that generates cryptographic protocol from high-level multiparty session description. They verify the executable protocol code using Z3 SMT solver. However, session description could not provide proofs of the correctness of the protocol itself.

For a limited kind of protocols there are specific tools that synthesize a proof. Formally Safe Routing (FSR) (see Literature Reference No. 41) is a toolkit for analyzing and implementing routing policies. It takes a policy (represented as a term in a certain algebra) and then transforms it to a statement that can be verified in SMT solver and to a declarative program to generate distributed implementation. This toolkit was used to analyze and find problems in an ASs iBGP configuration. These tools could be used only for specific problems.

Finally there are a number of very powerful general-purpose formal reasoning tools—including Coq, HOL, Isabelle, and our own MetaPRL (see Literature Reference No. 45, 46, 47, 48). However, such tools lack automation of some of the key cryptographic concepts, requiring enormous manual effort even for small cryptographic building blocks.

Currently there is a huge complexity gap between code that can be verified and code that is actually used. Most of today's code for cryptographic protocols is manually written and manually optimized. This is a very error-prone even for two-party protocols (e.g. SSL/TLS from previous slide), especially as new optimization, new platforms, and new protocol extensions are added. It is even harder to get right for complex multi-party protocols.

Proving correctness of cryptographic protocols has a long history. However, as discussed above, it is still a hard problem and none of the existing tools provides a simple way to proof that cryptographic protocol satisfy the given security properties. Thus, a continuing need exists for a system based on multilayer translation of a description of a protocol to a code using simple rules for each step automatically to provide a correct-by-construction protocol together with proof of its correctness.

SUMMARY OF INVENTION

This disclosure provides a system for synthesis of cryptographic software from specification. The system includes one or more processors and a memory. The memory having instructions encoded thereon such that upon execution of the instructions, the one or more processors perform a variety of tasks. For example, during operation, the system generates a first level formalization code of a cryptographic protocol based on a user input protocol specification and a library of transformation rules. A second level formalization code is then generated by implementing communication protocols to the first level formalization code. A third level formalization code subsequently generated by implementing cryptographic primitives to the second level formalization code. Finally, the third level formalization code is encoded on a computer readable medium as an executable code.

In another aspect, the second level formalization code is generated based on a communication specification and communication transformation rules in the library of transformation rules.

Additionally, the third level formalization code is generated based on a cryptographic primitive specification and cryptographic transformation rules in the library of transformation rules.

Further, the library of transformation rules includes compiler rules in a MetaPRL language.

In yet another aspect, the first, second, and third level formalization codes are generated by a MetaPRL formal compiler.

In another aspect, using the executable code, electronic communications are encrypted between two or more devices.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
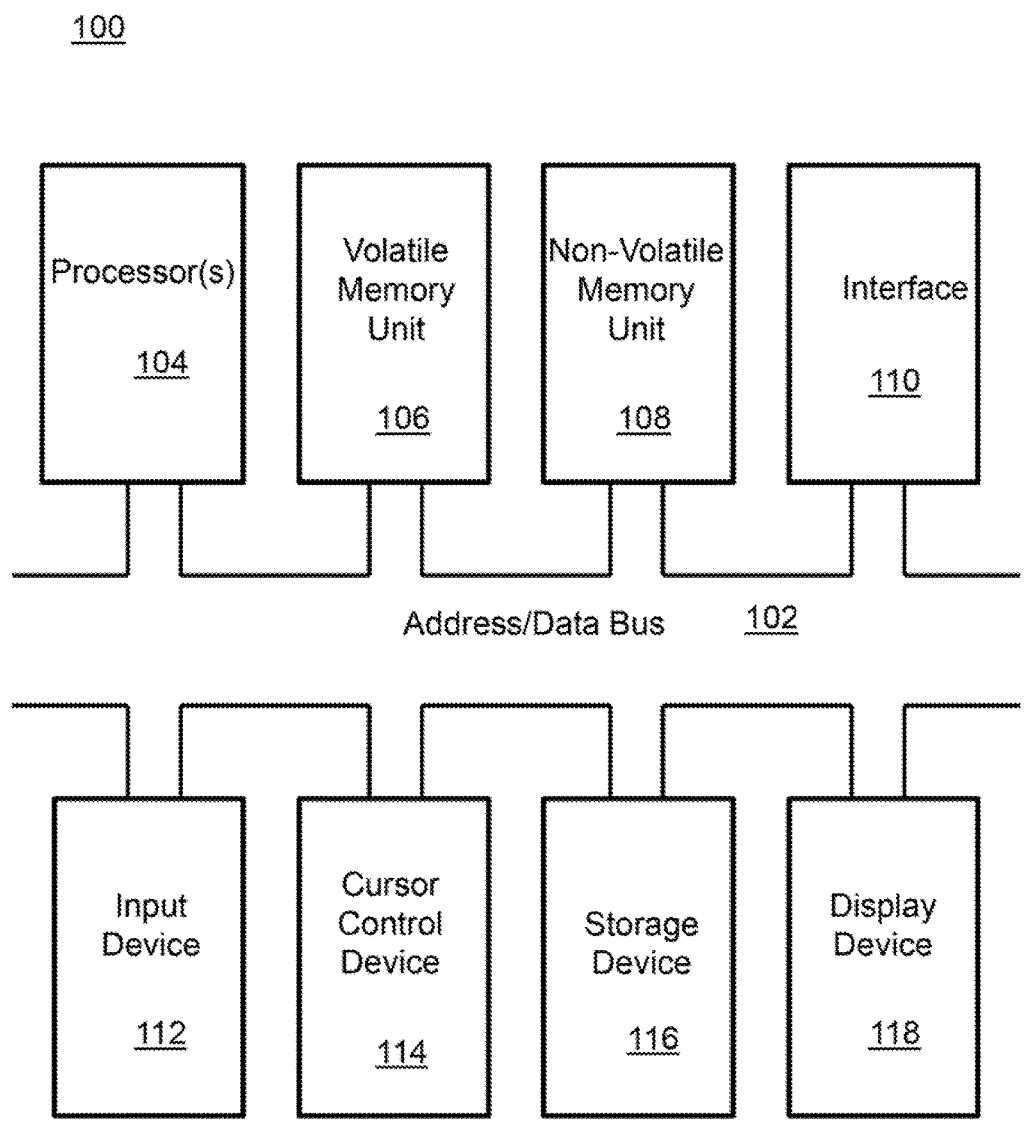
FIG. 1 is a block diagram depicting the components of a system according to various embodiments of the present invention.

The present invention relates to a system that automatically generates cryptographic software and, more specifically, to system and method for automated synthesis of a correct-by-construction cryptographic protocol and its secure reliable software representation.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of"step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Martn Abadi and Cédric Fournet. Mobile values, new names, and secure communication. *SIGPIAN Notices*, 36(3): 104-115, 2001.
2. Andrew W. Appel. Verification of a cryptographic primitive: SHA-256. *ACM Trans. Program. Lang. Syst.*, 37(2): 7:1-7:31, April 2015.
3. Karthikeyan Bhargavan, Ricardo Corin, Pierre-Malo Denielou, Cedric Fournet, and James J. Leifer. Cryptographic protocol synthesis and verification for multiparty sessions. 2012 *IEEE 25th Computer Security Foundations Symposium*, 0: 124-140, 2009.
4. Gilles Barthe, Juan Manuel Crespo, Sumit Gulwani, Cesar Kunz, and Mark Marron. From relational verification to SIMD loop synthesis. *SIGPLAN Not.*, 48(8):123-134, February 2013.
5. Michael Backes, Iliano Cervesato, Aaron D. Jaggard, Andre Scedrov, and Joe-Kai Tsay. Cryptographically sound security proofs for basic and public-key Kerberos. In *Proceedings of the 11th European Symposium on Research in Computer Security*, volume 4189 of *Lecture Notes in Computer Science*, pages 362-383. Springer Berlin/Heidelberg, September 2006.
6. Frederick Butler, Iliano Cervesato, Aaron D. Jaggard, Andre Scedrov, and Christopher Walstad. Formal analysis of Kerberos 5. *Theoretical Computer Science*, 367(1):57-87, 2006.
7. Frederick Butler, Iliano Cervesato, Aaron D. Jaggard, and Andre Scedrov. A formal analysis of some properties of Kerberos 5 using MSR. In *Fifteenth Computer Security Foundations Workshop (CSFW-15)*, pages 175-190. IEEE Computer Society Press, 2002.
8. Gilles Barthe, François Dupressoir, Benjamin Grégoire, César Kunz, Benedikt Schmidt, and Pierre-Yves Strub. Easycrypt: A tutorial. In Alessandro Aldini, Javier Lopez, and Fabio Martinelli, editors, *Foundations of Security Analysis and Design VII*, volume 8604 of *Lecture Notes in Computer Science*, pages 146-166. Springer International Publishing, 2014.
9. Karthikeyan Bhargavan, Cédric Fournet, Markulf Kohlweiss, Alfredo Pironti, Pierre-Yves Strub, and Santiago Zanella-Béguelin. Proving the TLS handshake secure (as it is). Cryptology ePrint Archive, Report 2014/182, 2014.
10. Gilles Barthe, Benjamin Grégoire, and Santiago Zanella Béguelin. Probabilistic relational Hoare logics for computer-aided security proofs. In Jeremy Gibbons and Pablo Nogueira, editors, *Mathematics of Program Construction*, volume 7342 of *Lecture Notes in Computer Science*, pages 1-6. Springer Berlin Heidelberg, 2012.
11. Michael Backes, Birgit Pfitzmann, and Michael Waidner. Symmetric authentication within a simulatable cryptographic library. In Einar Snekkenes and Dieter Gollmann, editors, *Computer Security—ESORICS* 2003, volume 2808 of *Lecture Notes in Computer Science*, pages 271-290. Springer Berlin Heidelberg, 2003.
12. Sally Browning and Philip Weaver. *Design and Verification of Microprocessor Systems for High-Assurance Applications*, chapter Designing Tunable, Verifiable Cryptographic Hardware Using Cryptol, pages 89-143. Springer US, Boston, Mass., 2010.
13. Iliano Cervesato. Typed MSR: Syntax and examples. In *MMM-ACNS'01: Proceedings of the International Workshop on Information Assurance in Computer Networks*, volume 2052 of *Lecture Notes In Computer Science*, pages 159-177. Springer-Verlag, 2001.
14. Iliano Cervesato, Aaron D. Jaggard, Andre Scedrov, Joe-Kai Tsay, and Christopher Walstad. Breaking and fixing public-key Kerberos. *Information and Computation*, 206(2-4):402-424, 2008.
15. Cas Cremers. On the protocol composition logic pcl. In *ASIACCS '08: Proceedings of the 2008 ACM symposium on Information, computer and communications security*, pages 66-76, New York, N.Y., USA, 2008. ACM.
16. Iliano Cervesato and Andre Scedrov. Relating state-based and process-based concurrency through linear logic (fill-version). *Information and Computation*, 207(10): 1044-1077, 2009.
17. Anupam Datta, Ante Derek, John C. Mitchell, and Arnab Roy. Protocol composition logic (pcl). *Electronic Notes in Theoretical Computer Science*, 172:311-358, 2007.
18. Easycrypt website. URL: https://www.easycrypt.info/trac/wiki/Bib.
19. Cédric Fournet and Martn Abadi. Hiding names: Private authentication in the applied pi calculus. In Mitsuhiro Okada, Benjamin C. Pierce, Andre Scedrov, Hideyuki Tokuda, and Akinori Yonezawa, editors, *ISSS* 2002, volume 2609 of *Lecture Notes in Computer Science*, pages 317-338. Springer, 2003.

20. Deepak Garg, Lujo Bauer, Kevin Bowers, Frank Pfenning, and Michael Reiter. A linear logic of authorization and knowledge. In *Proceedings of the 11th European Symposium on Research in Computer Security*, pages 297-312, 2006.
21. Jean-Yves Girard. Linear logic and parallelism. In *Proceedings on Mathematical Models for the Semantics of Parallelism*, pages 166-182, London, U K, 1987. Springer-Verlag.
22. Oded Goldreich. A simple protocol for signing contracts. In *Advances in Cryptology—Crypto '83*, London, UK, 1983. Springer-Verlag.
23. Jason Hickey and Aleksey Nogin. Extensible hierarchical tactic construction in a logical framework. In Konrad Slind, Annette Bunker, and Ganesh Gopalakrishnan, editors, *Proceedings of the 17th International Conference on Theorem Proving in Higher Order Logics (TPHOLs 2004)*, volume 3223 of *Lecture Notes in Computer Science*, pages 136-151. Springer-Verlag, 2004.
24. Jason Hickey and Aleksey Nogin. Formal compiler construction in a logical framework. *Higher-Order and Symbolic Computation*, 19(2-3):197-230, September 2006.
25. Jason Hickey, Aleksey Nogin, Robert L. Constable, Brian E. Aydemir, Eli Barzilay, Yegor Bryukhov, Richard Eaton, Adam Granicz, Alexei Kopylov, Christoph Kreitz, Vladimir N. Krupski, Lori Lorigo, Stephan Schmitt, Carl Witty, and Xin Yu. MetaPRL—A modular logical environment. In David Basin and Burkhart Wolff, editors, *Proceedings of the 16$^{th}$ International Conference on Theorem Proving in Higher Order Logics (TPHOLs 2003)*, volume 2758 of *Lecture Notes in Computer Science*, pages 287-303. Springer-Verlag, 2003.
26. C. A. R. Hoare. An axiomatic basis for computer programming. *Communications of the ACM*, 12(10):576-580, 1969.
27. Changhua He, Mukund Sundararajan, Anupam Datta, Ante Derek, and John C. Mitchell. A modular correctness proof of IEEE 802.1i and TLS. In *CCS '05: Proceedings of the 12th ACM conference on Computer and communications security*, pages 2-15, New York, N.Y., USA, 2005. ACM.
28. David Harel, Jerzy Tiuryn, and Dexter Kozen. *Dynamic Logic*. MIT Press, Cambridge, Mass., USA, 2000.
29. Grégoire Jacob, Eric Filiol, and Hervé Debar. Formalization of malware through process calculi. *CoRR*, abs/0902.0469, 2009. URL: http://-arxiv.org/abs/0902.0469.
30. Max Kanovich, Tajana Ban Kirigin, Vivek Nigam, Andre Scedrov, and Carolyn Talcott. Discrete vs. dense times in the verification of cyber-physical security protocols. In *POST*, 2015.
31. Max I. Kanovich, Paul Rowe, and Andre Scedrov. Collaborative planning with privacy. In *CSF*, pages 265-278. IEEE Computer Society, 2007.
32. Max I. Kanovich, Paul Rowe, and Andre Scedrov. Policy compliance in collaborative systems. In *CSF*, pages 218-233. IEEE Computer Society, 2009.
33. Ivan Lanese, Jorge A. Pérez, Davide Sangiorgi, and Alan Schmitt. On the expressiveness and decidability of higher-order process calculi. In *Proceedings of the 23rd Annual IEEE Symposium on Logic in Computer Science (LICS 2008)*, pages 145-155, June 2008.
34. Robin Milner. Sorts in the π-calculus (extended abstract). In Eike Best and Grzegorz Rozenberg, editors, *Proceedings of the Third Workshop on Concurrency and Compositionality (Goslar, Mar. 5-8, 1991)*, volume 191 of *GMD-Studien*. GMD Bonn, St. Augustin, 1991.
35. Aleksey Nogin and Jason Hickey. Sequent schema for derived rules. In Victor A. Carreño, Cézar A. Muñoz, and Sophiène Tahar, editors, *Proceedings of the 15$^{th}$ International Conference on Theorem Proving in Higher Order Logics (TPHOLs 2002)*, volume 2410 of *Lecture Notes in Computer Science*, pages 281-297. Springer-Verlag, 2002. ISBN 3-540-44039-9.
36. Daniel Perelman, Sumit Gulwani, Thomas Ball, and Dan Grossman. Type-directed completion of partial expressions. In *Proceedings of the 33rd ACM SIGPLAN Conference on Programming Language Design and Implementation*, PLDI '12, pages 275-286, New York, N.Y., USA, 2012. ACM.
37. Benjamin C. Pierce. Foundational calculi for programming languages. In Allen B. Tucker, editor, *Handbook of Computer Science and Engineering*, chapter 139, pages 2190-2207. CRC Press, 1997.
38. Arnab Roy, Anupam Datta, Ante Derek, and John C. Mitchell. Secrecy analysis in protocol composition logic. In *Proceedings of 11th Annual Asian Computing Science Conference*, 2006.
39. Davide Sangiorgi. From pi-calculus to higher-order pi-calculus—and back. In *TAPSOFT '93: Proceedings of the International Joint Conference CAAP/FASE on Theory and Practice of Software Development*, pages 151-166, London, U K, 1993. Springer-Verlag.
40. T. C. Scott and Wenxing Zhang. Efficient hybrid-symbolic methods for quantum mechanical calculations. *Computer Physics Communications*, 191:221-234, 2015.
41. A. Wang, L. Jia, W. Zhou, Y. Ren, B. T. Loo, J. Rexford, V. Nigam, A. Scedrov, and C. Talcott. FSR: Formal analysis and implementation toolkit for safe interdomain routing. *Networking, IEEE/ACM Transactions, on*, 20(6):1814-1827, December 2012.
42. Ningrong Zhang, Xingyuan Zhang, and Yuanyuan Wang. Mechanical proofs about BW multi-party contract signing protocol. *Wuhan University Journal of Natural Sciences*, 11(6):1516-1520, November 2006.
43. G. Barthe, B. Grégoire, S. Heraud, S. Zanella-Béguelin. Formal certification of ElGamal encryption. A gentle introduction to CertiCrypt. *In 5th International Workshop on Formal Aspects in Security and Trust, FAST 2008*, volume 5491 of *Lecture Notes in Computer Science*, pages 1-19, Springer, 2009.
44. Lennart Beringer, Adam Petcher, Katherine Q. Ye, and Andrew W. Appel. 2015. Verified correctness and security of OpenSSL HMAC. In *Proceedings of the 24th USENIX Conference on Security Symposium* (SEC'15), Jaeyeon Jung (Ed.). USENIX Association, Berkeley, Calif., USA, 207-221.
45. The Coq Proof Assistant. URL: https://coq.inria.fr/, taken on Jul. 20, 2017
46. HOL Interactive Theorem Prover. URL: https://hol-theorem-prover.org/, taken on Jul. 20, 2017.
47. Isabelle—University of Cambridge. URL: https://www.cl.cam.ac.uk/research/hvg/Isabelle/, taken on Jul. 20, 2017
48. MetaPRL Proof Assistant and Logical Programming Environment URL:metaprl.org, taken on Jul. 20, 2017.

(2) PRINCIPAL ASPECTS

Various embodiments of the invention include three "principal" aspects. The first is a system for automated synthesis of a correct-by-construction cryptographic protocol and its secure reliable software representation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
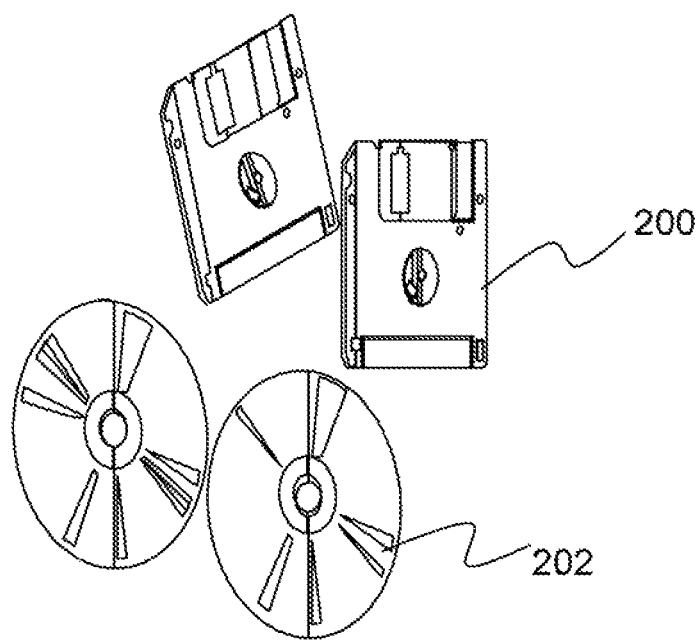
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure provides a system and method for automated synthesis of correct-by-construction cryptographic protocol and its secure reliable software representation from the formal verifiable specification of its desired security properties represented in a common computer-aided formal reasoning framework. This method allows implementing a tool that automatically produces cryptographic software (including implementation of complex multi-party protocols) with formal proof of its correctness.

Today's cryptographic code is notoriously unreliable. For example, a number of major vulnerabilities were recently discovered in all major software implementations of the SSL/TLS 2-party protocol. At the same time, new secure multi-party protocols are being developed. These new protocols provide a promise of unprecedented capabilities in secure computation, privacy-preserving data mining, and other applications. Taking advantage of the new protocols requires implementing them in software; however, these protocols are a lot more complex than SSL/TLS and, as such, require a better method for creating implementations that are both highly optimized and free of security vulnerabilities. Thus, the system and method described herein provides a tool that takes formal specification of the protocol and produces a correct-by-construction code. The system and method according to this disclosure is capable of multilayer protocol stacks for complex systems by translating a description of a protocol to a code using formal step-by-step rules for each level of abstraction.

The system and method described herein has several potential applications. For example, the system can be used for secure access for commercial subscribers to BCA's Commercial Aviation Services (CAS) platform data. The system can also be used for building secure UAV mission control architectures. As yet another example implementation, the system can be used to build secure and reliable remove diagnostics and vehicle control programs, secure vehicle to vehicle communication, safety analysis programs, and other electronic communications such as cell to network, server to client, or vehicle to control system. Further details are provided below.

(4) SPECIFIC DETAILS OF VARIOUS EMBODIMENTS

As discussed there are several languages for formally describing cryptographic protocols. To reason about protocol properties one need not only a language to describe protocols, but also model to provide the definition of protocol behavior. Dolev-Yao is a model of protocols where cryptographic primitives are modeled as abstract functions. Literature Reference No. 5 extends the verification of basic Kerberos protocol to the verification if Kerberos protocol with public-key extension PKINIT. It is using Dolev-Yao style model of Backes, Pfitzmann, and Waidner (BPW model) (see Literature Reference No. 11). It allows extending soundness to a computational model. However, it turns out that models that use discrete time may not be adequate when describing cyber-physical protocols (such as Distance-Bounding Protocol). Namely, there are attacks that can be exploited in models using dense time, but are impossible in models using discrete time (see, for example, Literature Reference No. 30).

The tool according to the principles of the present invention uses the same language for description of protocol properties that was used in EasyCrypt. For example, the system takes description of the model as an input. Also, the system includes library of rules for transformation description of the protocol in high-level to the lower-level. A standard high-order sequent calculus is used to write these rules. For example, Literature Reference No. 35 describes a process for writing such rules.

Figure 3:
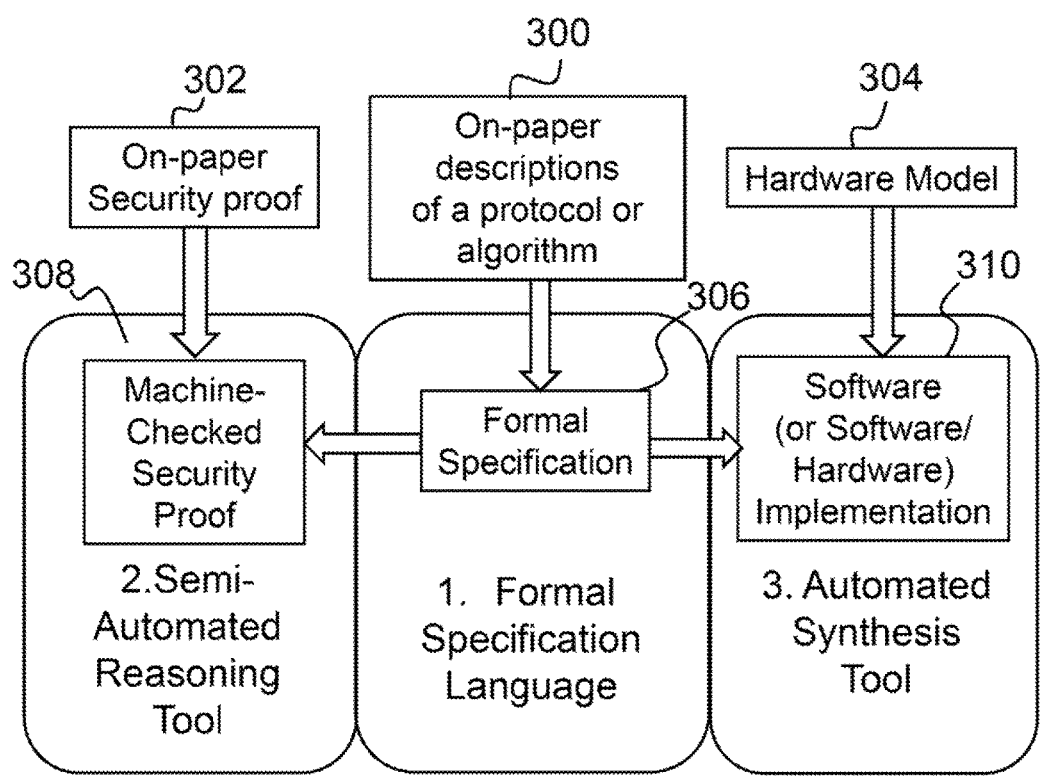
FIG. 3 is a flowchart illustrating a formal synthesis of a Secure Code Process.

FIG. 3, for example, shows the steps in the process of formal synthesis of secure code. This process starts with an on-paper description of a protocol of algorithm 300, an on-paper security proof 302 and a hardware model 304. The system starts by translating the informal description of a protocol 300 to formal specification 306 in a formal specification language. This step is done in interactive mode when the user provide guidance and the system checks the correctness of the specification. The interaction between user and the system is the following. The user provides the goal of the specification. The system search in the library for rules that with the pattern that matches the specification and applies these rules. The system then uses this specification 306 to the check paper proof 302 using a semi-automated reasoning tool (for example MetaPRL theorem prover) to generate a machine-checked security proof 308. After generation of the machine-checked security proof 308, this system uses an automated synthesis tool to automatically synthesize the software implementation 310 from the specification 306.

The system uses, for example, the MetaPRL theorem prover (see Literature Reference No. 25) for translation between different levels of formalization. This is done by compilation where existing top-down and bottom-up proof-search heuristics in MetaPRL will guide property compilation. The MetaPRL theorem prover, an open source tool (see, for example, Literature Reference No. 25), is desirable for the following reasons. First, MetaPRL is designed as a logical framework; it can be used for any logic even without formal semantics. Second, MetaPRL was already successfully used for formal compilation in the context of compiler implementation (see, for example, Literature Reference No. 24). Third, MetaPRL has a very straightforward and easy way to tell automated heuristic how to apply a given rule. Finally, MetaPRL proof engine supports easy proof reuse in case something changes.

Figure 4:
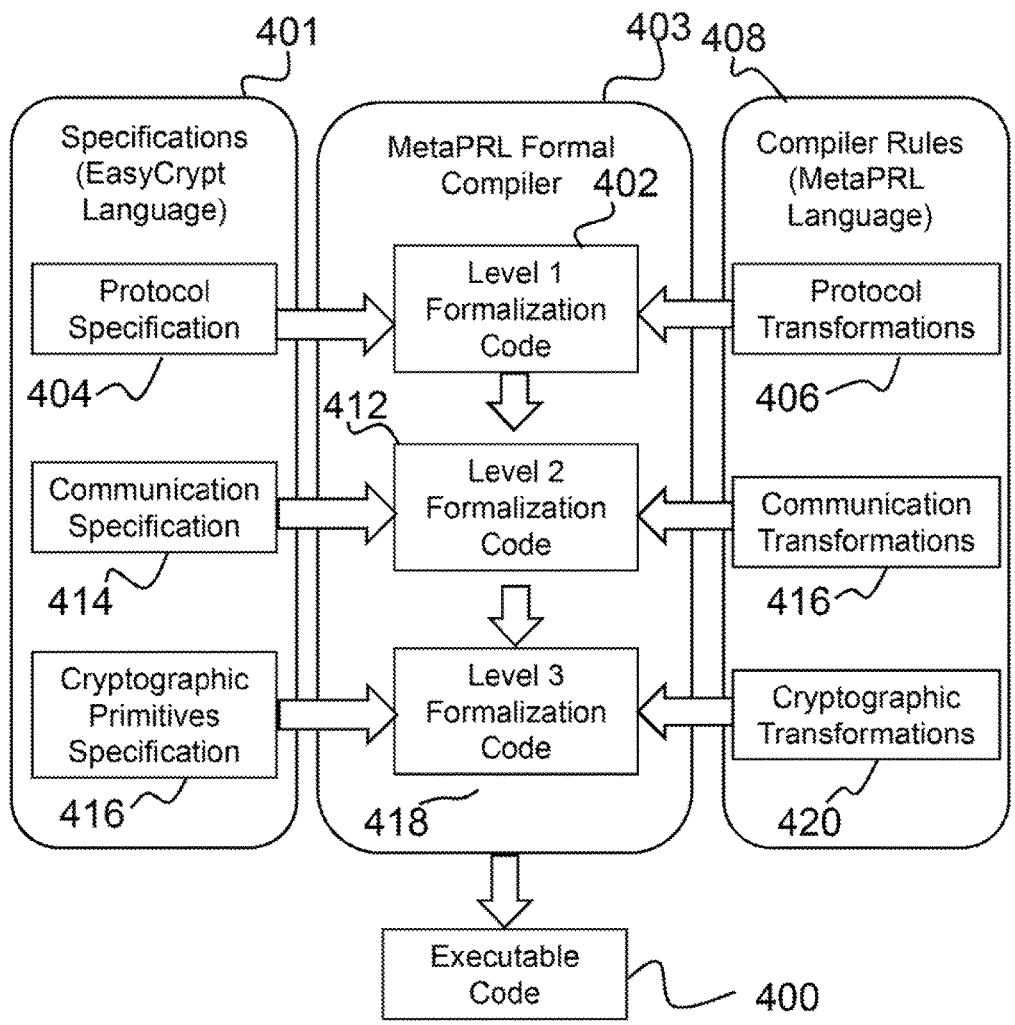
FIG. 4 is an illustration depicting an architecture of the synthesis tool according to principles of the present invention.

The architecture of the automated synthesis tool is shown in FIG. 4. The synthesis tool constructs the executable code 400 in several steps. Each step provides more detailed code. For example, the first level generates the code 402 on the level of protocol specification 404 (e.g., of the cryptographic protocol) based on protocol transformation rules 406 from a library of transformation rules 408 (i.e., compiler rules). The library of transformation rules 408 includes a set of inference rules that provides connection between the languages (e.g., EasyCrypt Language 401) and tactics for applying those rules by the MetaPRL Formal Compiler 403 to generate the various levels of formalization code. The MetaPRL Formal Compiler 403 is a part of the MetaPRL theorem prover described above.

On the next level, the system takes into account communication specification 410 to generate second level code 412 based on the communications transformation rules 414 from the library of rules 416. On the third level, the system expands cryptographic primitives 416 with their implementation in the third level code 418 based on the cryptographic transformations rules 420. On each step the system uses the library of transformation rules 408 written in MetaPRL to generate the formalization code, which is ultimately written as the executable code 400 using standard compilers known to those skilled in the art.

An example of the rule that can be applied on level I is the following rule that instantiates a dealing of a secret to a concrete implementation of it multi-party computation primitives (see Literature Reference No. 3). The following is formalization of this rule in MetaPRL syntax:
rule mpc_deal {|intro [ ]|}:
⟨Γ⟩ ⊢ n:Int →
⟨Γ⟩ ⊢ F:Field →
⟨Γ⟩, i:Int, 0<i<n ⊢ r[i]: Random(F) →
⟨Γ⟩ ⊢d secret+sum (map (\j→r[j]*x^j) [1 ... n−1]) →
⟨Γ⟩ ⊢ d=deal(secret,n)
This rule could be applied to a specification of a protocol that has a formula that deals a secret.

The second level instantiates the code with the implementation of concrete communication protocols. For example it can implement the protocol over point-to-point communication.
rule collect_shares {|intro [ ]|}:
⟨Γ⟩ ⊢ T:Type →
⟨Γ⟩ ⊢ a:agents →T →
⟨Γ⟩, x:agents ⊢ a[x]=receive (x, d) →
⟨Γ⟩ ⊢ a=collect_shares(s,agents)

The third level supplies the cryptographic primitives with concrete specification. For example, it can instantiate field operations with concrete operations modulo p, where p is a prime number:
rule Field_module_p {|AutoMustComplete [ ]|}:
⟨Γ⟩ ⊢ p:Prime →
⟨Γ⟩ ⊢ (Int, (+), (*), (modEq p)): Field Each step is guided by tactics that are provided by a theorem prover. Tactics are also used to automate part of the verification process. These tactics can verify the properties that are straightforward to verify or can help an analyst by highlighting the place of the protocol that needs to be verified to check a particular property.

The tactics are extensible. In particular, new rules may automatically increase the power of the existing tactics. In order to tell tactics what rules should be applied, the rules have special annotations (see Literature Reference No. 23). These annotations help tactics learn what kind of rules should be applied in different situations. These simple tools allow analysts to add new rules to the system, and these new rules would be immediately available for use by the existing tactics.

In an embodiment, the algorithm for applying the inference rules includes the following. The specification is written as a formula in the high-order language. Each rule has a single goal and zero, one, or several subgoals. Each goal and subgoal is a term in the high-order language. The rule is said to be applicable to the given formula if there is a substitution of free variables of the goal of the rule such that when the goal is instantiated with this substitution we get the given formula. To find whether a rule is applicable the pattern-matching algorithm is used (see Literature Reference No. 23). When the applicable rule is found, it is instantiated with the appropriate substitution. The current formula is substituted by the set of the subgoals of the rule that were instantiated with the same substitution. This process is repeated until no more goals are left. Other embodiments may apply one or more parts of the algorithm of this paragraph.

The order in which rules are applied can be important in various embodiments, and may be guided by annotations to the rules. In some embodiments, we use the following sequence: first we apply the rule that has no subgoals. Then the rules that annotated with "Trivial" annotation are applied. Then the rules that have only one subgoal that is simpler than the goal (according to a given metric) are applied. Then the rules that labeled with "AutoMustComplete" annotation is applied. In some embodiments, such rules are applied only when recursive application of this algorithm is completely "proves" (i.e. leaves no subgoals) this formula. Then the rules with Auto tactic is applied.

After applying these steps, the functional program is extracted from the proof using Curry-Howard isomorphism. Then, this program is compiled into executable code using the standard compiler.

For example, consider the following specification for a simple multi-party computation protocol:

```
module Protocol (O : Opener) = {
    module A = Agent1
        proc collect_shares (deal : field list, agents :
    int list) : (int * field) list = {
        return zip_o agents (map (nth deal) agents);
    }
    proc main(secret : input1, agents : int list) : bool =
{
        var d:output1;
        var o:field option;
        var a;
        d=A.deal(secret,n);
        a=rollect_shares(d,agents);
        o = O.open(a);
        return o = Some secret;
    }
}.
```

The tool produces the software implementation of this protocol by:
1. Providing instances of fields;
2. Providing instances random number generators; and
3. Providing instances of communication.

Further, the system can formulate a property that knowing two 3-shares does not provide any information about a secret. First, a part of a protocol is formulated where a party reveals two shares of a secret:
clone Protocol as Example with
    type input1=G; -- secret
    typeoutput1=Garray; --deal
    type leak1=unit;
    type input2=int * (G array)
    type rand1=G array; -- random number generator
    type conv=G array; -- the information given to adviser
    op valid inputs (n,shares)=n>=1/\length shares
        <n/\forall (!=0) shares
    op deal (r: G array) (secret:G) (n:int) (i:G)={
        secret+sum (map (\j →r[j]*x^j)
    [1 ... n−1])
    }
    op protocol (secret:input1) (r:rand1) ((n,shares):input2)=

```
let conv=map (deal r secret n) shares in (conv, ( )) --
    reveal length(shares)
    shares
}
```

Then, the system proves a theorem that states that for any advisory A there is an advisory A', such that AdvExample (A)≤AdvNoSharing(A'), where NoSharing is a protocol without any conversation. That is, this protocol does not reveal more information than a protocol without any conversation. This theorem could be proved by using the provided library and tactics that guides semiautomatic proofs.

Thus, the system is implemented as a formal theory in a MetaPRL environment. This formal theory includes a formal description of a protocol language, formal language for property specification, description of a programming language for implementation. It has a set of inference rules that provides connection between those languages and tactics for applying those rules.

Given the overview above, the present invention operates as follows:
1. The user provides the description of the specification of the cryptographic protocol.
2. The tool provides the implementation of the protocol using a library of transformation rules.
3. The tool will choose appropriate implementations of underlying communication protocols from the library.
4. The tool will add the implementation of cryptographic primitives.
5. The result is an executable code that is written onto a computer readable medium (e.g., hard drive, flash drive, cloud based server, etc.) that is an implementation of a protocol with the formal proof that it satisfy the given specification.

Given the description above, one can understand how the system automatically generates cryptographic software given a description of the cryptographic protocol as an input. As a non-limiting example, the system can generate cryptographic software for implementing a secret-share protocol in multi-party computation.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

The invention claimed is:

1. A system for synthesis of cryptographic software from specification, comprising:
   one or more processors and a memory, the memory having instructions encoded thereon, such that upon execution of the instructions, the one or more processors perform operations of:
   generating a first level formalization code of a cryptographic protocol based on a protocol specification and a library of transformation rules;
   generating a second level formalization code by implementing communication protocols to the first level formalization code;
   generating a third level formalization code by implementing cryptographic primitives to the second level formalization code; and
   encoding the third level formalization code on a computer readable medium as an executable code.

2. The system as set forth in claim 1, wherein the third level formalization code is generated based on a cryptographic primitive specification and cryptographic transformation rules in the library of transformation rules.

3. The system as set forth in claim 1, wherein the library of transformation rules includes compiler rules in a MetaPRL language.

4. The system as set forth in claim 1, wherein the first, second, and third level formalization codes are generated by a MetaPRL formal compiler.

5. The system as set forth in claim 1, wherein using the executable code, the one or more processors further perform an operation of encrypting electronic communications between two or more devices.

6. The system as set forth in claim 1, wherein the second level formalization code is generated based on a communication specification and communication transformation rules in the library of transformation rules.

7. The system as set forth in claim 6, wherein the third level formalization code is generated based on a cryptographic primitive specification and cryptographic transformation rules in the library of transformation rules.

8. The system as set forth in claim 7, wherein the library of transformation rules includes compiler rules in a MetaPRL language.

9. The system as set forth in claim 8, wherein the first, second, and third level formalization codes are generated by a MetaPRL formal compiler.

10. A computer program product for synthesis of cryptographic software from specification, the computer program product comprising:
    a non-transitory computer-readable medium having executable instructions encoded thereon, such that upon execution of the instructions by one or more processors, the one or more processors perform operations of:
    generating a first level formalization code of a cryptographic protocol based on a protocol specification and a library of transformation rules;
    generating a second level formalization code by implementing communication protocols to the first level formalization code;
    generating a third level formalization code by implementing cryptographic primitives to the second level formalization code; and
    encoding the third level formalization code on a computer readable medium as an executable code.

11. The computer program product as set forth in claim 10, wherein the second level formalization code is generated based on a communication specification and communication transformation rules in the library of transformation rules.

12. The computer program product as set forth in claim 10, wherein the third level formalization code is generated based on a cryptographic primitive specification and cryptographic transformation rules in the library of transformation rules.

13. The computer program product as set forth in claim 10, wherein the library of transformation rules includes compiler rules in a MetaPRL language.

14. The computer program product as set forth in claim 10, wherein the first, second, and third level formalization codes are generated by a MetaPRL formal compiler.

15. A computer implemented method for synthesis of cryptographic software from specification, the method comprising an act of:

causing one or more processors to execute instructions encoded on a non-transitory computer-readable medium, such that upon execution, the one or more processors perform operations of:

generating a first level formalization code of a cryptographic protocol based on a protocol specification and a library of transformation rules;

generating a second level formalization code by implementing communication protocols to the first level formalization code;

generating a third level formalization code by implementing cryptographic primitives to the second level formalization code; and encoding the third level formalization code on a computer readable medium as an executable code.

16. The computer implemented method as set forth in claim 15, wherein the second level formalization code is generated based on a communication specification and communication transformation rules in the library of transformation rules.

17. The computer implemented method as set forth in claim 15, wherein the third level formalization code is generated based on a cryptographic primitive specification and cryptographic transformation rules in the library of transformation rules.

18. The computer implemented method as set forth in claim 15, wherein the library of transformation rules includes compiler rules in a MetaPRL language.

19. The computer implemented method as set forth in claim 15, wherein the first, second, and third level formalization codes are generated by a MetaPRL formal compiler.

20. The computer implemented method as set forth in claim 15, wherein using the executable code, the one or more processors further perform an operation of encrypting electronic communications between two or more devices.

* * * * *